United States Patent Office 3,521,302
Patented July 21, 1970

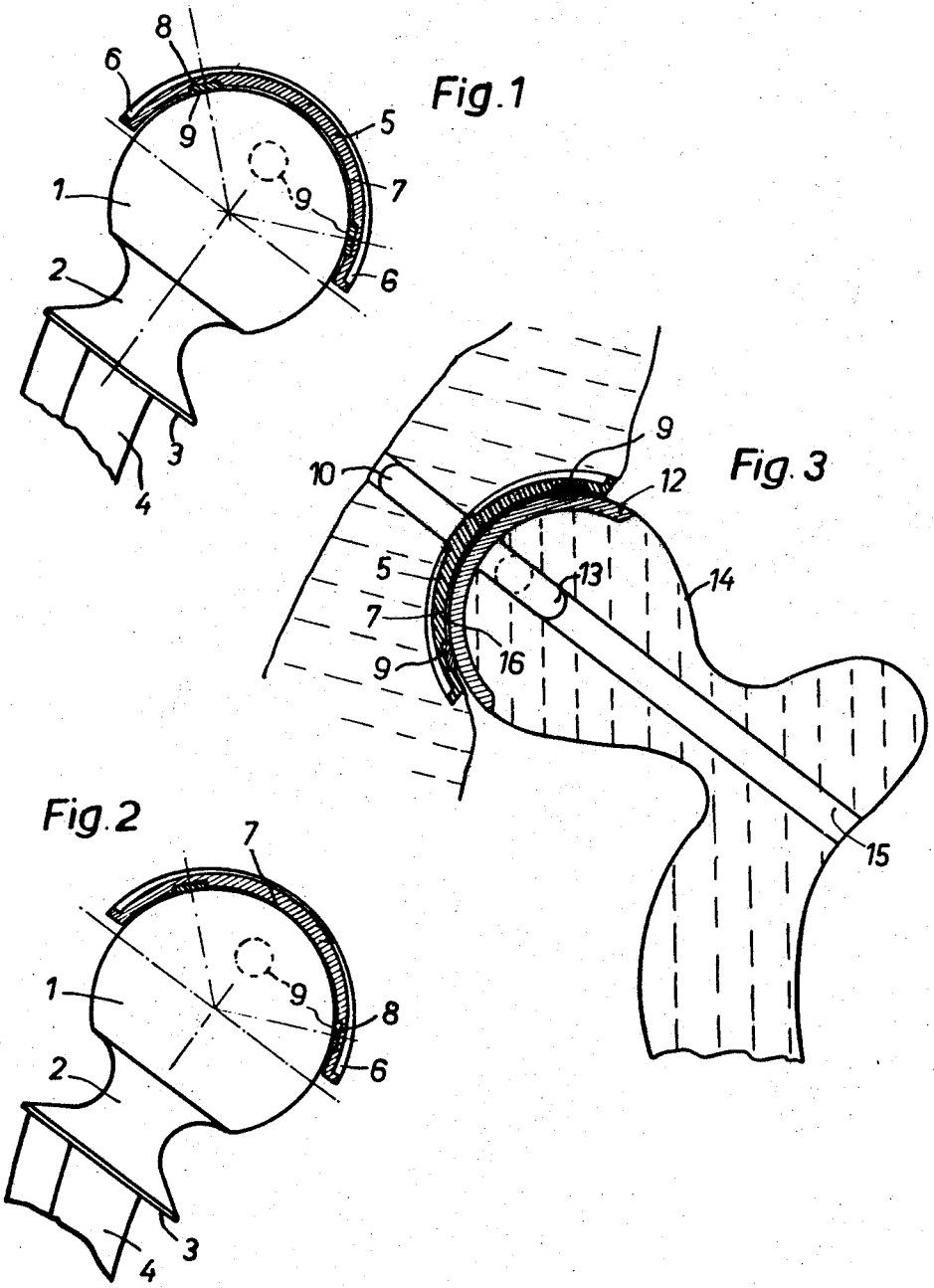

3,521,302
PROSTHETIC IMPLANT JOINT HAVING COMPRESSIBLE SLIDE MEMBERS TO PROMOTE JOINT LUBRICATION
Maurice E. Müller, Bern, Switzerland, assignor to Sulzer Brothers, Ltd., Winterthur, Switzerland, a corporation of Switzerland
Filed Sept. 1, 1967, Ser. No. 665,146
Claims priority, application Switzerland, Sept. 2, 1966, 12,768/66
Int. Cl. A61f 1/24
U.S. Cl. 3—1    15 Claims

ABSTRACT OF THE DISCLOSURE

The artificial joint is formed by a pair of substantially complementary shaped prosthetic members which have a resiliently compressible slide member disposed between them. The resiliently compressible slide member maintains the prosthetic members in spaced relation when in an unladen state but allows the prosthetic members to contact each other when in a laden state. In the latter state, the slide member is compressed within a recess within one of the prosthetic members.

This invention relates to an artificial joint.

Heretofore, artificial joints have been made in which the jointed parts are made with members of metal to obtain a metal to metal slide contact or with one metal member and one synthetic member to obtain a metal to synthetic contact. For example, in an artificial hip joint, the hip joint ball is made of metal and is mounted in a socket made either from biologically compatible synthetic plastics material or from metal. In either instance, both the hip joint ball and hip joint socket have had coincident spherical sliding surfaces which slide on each other as the joint moves.

However, since the surfaces in these above joints cannot be lubricated, the sliding of a hip joint ball made from metal in a synthetic plastics socket in time produces wear by a flow of the plastic or, where a metal hip joint ball slides in a metal hip joint socket, wear results from the abrasion of metal particles.

Accordingly, it is an object of the invention to reduce the wear between artificial joint members.

It is another object of the invention to permit lubrication to enter between the slidable members of an artificial joint.

It is another object of the invention to produce a point contact between relatively slidable members of an artificial joint.

Briefly, the invention provides an artificial joint for bones wherein an internal joint part is mounted in an external joint part and at least one slide member of resiliently compressible material is mounted in one of the joint parts in facing relation to the other joint part. The slide member is constructed to slide on a sliding surface of the other joint part as the joint moves while maintaining the relatively sliding surfaces of the joint parts in spaced relation when the joint is in an unloaded state. The slide member compresses into the one joint member when the joint is in a loaded state to permit the sliding surfaces of the joint parts to contact each other.

In one embodiment, the joint parts are formed with spherical sliding surfaces with the internal joint part sliding surface being of a slightly less radius than the external joint part sliding surface. Upon movement of the joint while in a loaded state, the sliding surfaces contact each other with a point contact while the remainder of the sliding surfaces remain spaced apart.

In one embodiment of an artificial hip joint, the joint parts are formed as a ball and a socket with the ball being adapted for securement to a truncated portion of a femur. In another embodiment of an artificial hip joint, one of the joint parts is formed as a capping which is adapted for securement to the head of a femur while the other joint part is formed as a socket.

These and other objects and advantages of the invention will become more apparent from the following detailed description and appended claims taken in conjunction with the accompanying drawings in which:

FIG. 1 diagrammatically illustrates a longitudinal section of an artificial hip joint of the invention in an unloaded state;

FIG. 2 diagrammatically illustrates a section similar to FIG. 1 of the artificial hip joint in a loaded state; and FIG. 3 diagrammatically illustrates an artificial hip joint of the invention having a capping placed on the head of a femur.

Referring to FIG. 1, a prosthetic implant joint in the form of an artificial hip joint includes an internal joint part having a part spherical head 1 and an adjacent neck 2. The neck 2 has a base surface 3 which is intended to abut the end face of the part of the femur remaining in a patient's body. A swordlike rod 4 (part of which is shown) extends from the base surface 3 and is intended to be cemented into the shaft of the femur by means of, for example, a methylmethacrylate preparation. This internal joint part including the head 1, neck 2 and rod 4 consists of a single piece and is preferably cast from a biologically compatible metal alloy of 30 parts chromium, 7 parts molybdenum and 58 parts cobalt, which is obtainable under the trademark "Protasul." The surface of the head 1 is machined as accurately as possible to a spherical surface and is polished smooth to provide a sliding surface.

Additionally, the artificial hip joint includes an external joint part having a socket 5 of thin thickness which is made of the same metal alloy as the head 1 and which is dished in the shape almost of a hemispherical cup. The socket 5 is reinforced with ribs 6 on the outer side. The inner surface 7 of the socket 5 is machined so as to be exactly spherical with a radius approximately 0.2 to 0.3 mm. greater than the sliding surface of the head 1. The inner surface 7 is further formed with three flat circular depressions 8 which are arranged at equal angular distances from each other on axes which lie on a cone, for example, a cone having an apex angle of 110° and an axis which forms a small angle with the axis of symmetry of the socket 5. The socket 5 is secured in the hip bone of a patient by means of methylmethacrylate used as a cementing compound.

A slide member in the form of a discrete circular disc 9 made of a biologically compatible pressed high-density polyethylene is inserted in each depression 8. Each disc 9 has a surface facing the center of the socket 5 which is spherically shaped and which protrudes beyond the inner surface 7 of the socket 5 by approximately 0.2 to 0.3 mm.

In an unloaded state, the spherical head 1 which is mounted in a patient's femur is held by the three discrete polyethylene discs 9 concentrically of and in spaced relation to the socket 5 which is mounted on the patient's pelvis. The space between the sliding surface of the head 1 and the inner face of the socket 5 is filled with the patient's body fluid which lubricates the sliding surface and permits easy sliding on the discs 9 when the joint moves.

In a loaded state of the joint, the polyethylene discs 9 are compressed by the force which they transmit from the socket 5 to the head 1, until the inner face 7 of the socket 5 is in contact with the sliding surface of the head 1 (FIG. 2). Since the radius of the head 1 is a fraction of a millimeter smaller than that of the inner face 7 of the socket 5, which then likewise acts as a sliding surface for the head 1, contact between these surfaces occurs theoretically at only one point. But, in practice, by virtue of the inevitable unevenness of these surfaces and the elasticity of the material, contact occurs at three spots which, as the joint moves, migrate along circular paths, their form, size and relative positions changing by virtue of the aforesaid unevennesses.

Since the two sliding surfaces are still separated from each other around their points of contact by a thin layer of body fluid, they still remain lubricated even at their points of contact.

Referring to FIG. 3, where the femur head 12 is still intact except for the sliding surface cartilage which is removed by necessity, the internal joint part of the artificial joint has a spherical cup-shaped capping 12 with a stem 13 which is cemented into a passage 15 drilled longitudinally through the femur head 14 from outside. The stem 13 is cemented by use of a methylmethacrylate as above. In addition, the socket 5 which is similar to that described above as indicated by like reference characters is provided with a stem 10 on the outer side for improved securement in the hip bone. The stem 10 is secured in a drilled passage in the hip bone, for example, by cementing with a methylmethacrylate adhesive.

The capping 12 has an external spherical sliding surface 16, the radius of which is some 0.2 to 0.3 mm. less than the radius of the spherical inside face 7 of the socket 5. The socket 5 and discs 9 cooperate with the capping 12 in the same manner as described above with regard to the head 1.

The invention provides an artificial joint which reduces the wear heretofore attendant with joints having metal to metal contact or metal to plastic contact. While the invention has been described above in relation to a ball-and-socket type artificial joint, the invention can also be incorporated in a knee or elbow joint prosthesis with a cylindrical sliding surface on the head joint part and a cylindrical inside surface on the socket part.

What is claimed is:

1. A prosthetic implant joint for bones comprising
   an external joint part made of a biologically compatible material having an internal sliding surface thereon,
   an internal joint part made of biologically compatible material having an external sliding surface thereon disposed in facing relation to said internal sliding surface, and
   a plurality of discrete slide members mounted in the sliding surface of one of said joint parts in facing relation to the sliding surface of the other of said parts for sliding thereon, each said slide member projecting from said one joint part to space said joint parts from each other and being of a resiliently compressible material whereby in an unloaded state of the artificial joint said slide members maintain the sliding surfaces of said parts apart to permit lubrication of said sliding faces.

2. A prosthetic implant joint as set forth in claim 1 wherein said one joint part is said external joint part.

3. A prosthetic implant joint as set forth in claim 1 wherein said one joint part has recesses in said sliding surface thereof receiving said slide members therein whereby in a loaded state of the artificial joint said slide members compresses into said recesses to permit said sliding surfaces to contact each other.

4. A prosthetic implant joint as set forth in claim 1 wherein each said sliding surface is spherical.

5. A prosthetic implant joint as set forth in claim 4 which includes three of said slide members mounted in the sliding surface of said one joint part.

6. A prosthetic implant joint as set forth in claim 1 wherein said slide member is made of a biologically compatible synthetic plastics material.

7. A prosthetic implant joint as set forth in claim 6 wherein said material is polyethylene.

8. A prosthetic implant joint as set forth in claim 1 wherein at least one joint part is made of a metal alloy.

9. A prosthetic implant joint as set forth in claim 8 wherein said metal alloy is 30 parts chromium, 7 parts molybdenum and 58 parts cobalt.

10. A prosthetic implant joint as set forth in claim 1 wherein said internal joint part includes a head and a neck seating said head thereon.

11. A prosthetic implant joint as set forth in claim 10 wherein said head has a part spherical shape.

12. A prosthetic implant joint as set forth in claim 1 wherein said etxernal joint part is dished.

13. A prosthetic implant joint as set forth in claim 12 wherein said internal joint part is cup-shaped.

14. A prosthetic implant joint as set forth in claim 12 wherein said external joint part further includes reinforcing ribs on the external surface.

15. A prosthetic implant joint as set forth in claim 1 wherein at least one of said joint parts includes a stem projecting from a surface opposite said sliding surface thereon in a direction away from said sliding surface.

References Cited

UNITED STATES PATENTS

| 2,200,440 | 5/1940 | Atwood | 287—87 XR |
| 2,668,531 | 2/1954 | Haboush. | |
| 3,401,962 | 9/1968 | Scheublein et al. | |

FOREIGN PATENTS

| 1,122,634 | 9/1956 | France. |
| 1,448,955 | 7/1966 | France. |

OTHER REFERENCES

"Arthroplasty Cup With Center Pin" by C. Scuderi, Surgery, Gynecology & Obstetrics, May 1955, pp. 631 and 632.

McBride Acetabulum Cups, Vitallium Surgical Appliances catalog, Austenal Company, Div. of Howe Sound Co., New York, N.Y. P. 30, 1964.

RICHARD A. GAUDET, Primary Examiner

R. L. FRINKS, Assistant Examiner

U.S. Cl. X.R.

128—92; 287—87